United States Patent [19]

Silvestri

[11] 4,083,094
[45] Apr. 11, 1978

[54] GEAR TOOTH ALIGNMENT BY ACCOMMODATION

[76] Inventor: Giovanni J. Silvestri, 4 Meadowbrook Dr., Barrington, R.I. 02806

[21] Appl. No.: 798,062

[22] Filed: May 18, 1977

[51] Int. Cl.² .................. B21D 53/28; B23P 15/14
[52] U.S. Cl. ............................... 29/159.2; 29/434; 29/469; 74/410; 74/411; 219/121 EM
[58] Field of Search ............... 29/469, 159.2, 428, 29/434; 219/121 EM; 74/801, 410, 411

[56] References Cited
U.S. PATENT DOCUMENTS

| | | | |
|---|---|---|---|
| 3,213,713 | 10/1965 | Sagara | 74/410 X |
| 3,245,279 | 4/1966 | Baker | 74/410 |
| 3,381,548 | 5/1968 | Wolkenstein | 74/801 |
| 3,964,334 | 6/1976 | Hicks | 74/410 |
| 3,974,718 | 8/1976 | Kylberg | 74/410 X |

Primary Examiner—Victor A. DiPalma
Attorney, Agent, or Firm—Richard S. Sciascia; Arthur A. McGill; Prithvi C. Lall

[57] ABSTRACT

Apparatus and method for gear tooth alignment by accommodation in more than one stage gear cluster assembly. This arrangement essentially isolates the mass of one gear member in a cluster assembly from that of the other and makes the effective mass at the gear mesh to be equal to or less than that of a gear on either end of the gear shaft with respect to its connected masses. This permits a design for extremely high power ratio for a gear train by isolating inertias of the elements and reducing dynamic loads and forming a torsionally soft shaft to allow alignment of the gear teeth by accommodation by allowing the unbalanced load in between the gears to enable the gears to mesh together.

3 Claims, 3 Drawing Figures

GEAR TOOTH ALIGNMENT BY ACCOMMODATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This application is co-pending with my eight other patent applications related to a high pressure air turbine-gear train assembly describing and claiming various aspects thereof.

This invention relates to a high pressure air turbine-gear train assembly and more particularly to a gear tooth alignment technique by accommodation as a means of changing the effective tooth positional accuracy between a first stage gear and a second stage pinion on the same shaft when used with other like units in a parallel or a branched gear system of more than one stage.

When power is transmitted between two stages of any parallel or branched gear system; including epicyclic, star and parallel gear arrangements of more than one stage; any misalignment between the teeth of the first stage gear and the second stage pinion will, when assembled in the gear train, cause unbalanced loading of the gear teeth. The magnitude of the unbalanced load will be a function of the stiffness of the shaft between the gears, the stiffness of the teeth and the extent of the misalignment. First-to-second stage clusters have generally been made as a single member in the past and stringent machining accuracy has been used to result in a reasonable positional accuracy. This can be done when stresses permit machining processes which do not inlcude hardening and grinding, i.e., it is limited to low load applications and/or excessively large gears for high power applications. However, when limited life, lightweight and high loads are dictated, the need for very high wear and bending strength and for optimum load distributions make use of hardened and ground gears mandatory and forces the clusters to be made as two pieces which are then joined to form a compact unit. This joining of two pieces amplifies the positional inaccuracies unless tolerated by some other means. It is thus desirable to have a configuration which provides a means for compensating for the effects of the positional errors after assembly which should also reduce the dynamic increment of load and tooth stresses resulting during operation.

SUMMARY OF THE INVENTION

Apparatus and method for gear tooth alignment by accommodation includes an arrangement which essentially isolates the mass of one gear in the cluster assembly from that of the other gear and makes the effective mass at the gear mesh to be equal or less than the gear on either end of the shaft with respect to its connected masses. This arrangement thus permits the design for extremely high power to weight ratios for a speed reducer by isolating inertias of the elements and reducing dynamic loads. This also results in a torsionally soft shaft with a length which allows the torsional deflection thereof under small loads and thus corrects for the positional inaccuracies of the gears of the cluster assembly.

An object of subject invention is to have an arrangement which equalizes the load distribution over a multiple of gear clusters in a parallel, a branched or an epicyclic gear system without the need for extreme precision in gear tooth positioning during manufacture.

Another object of subject invention is to permit a design for extremely high power to weight ratio for a speed reducer by isolating inertias of the elements and reducing dynamic loads.

Still another object of subject invention is to have a speed reducer arrangement which provides equalizing the load distribution in a gear cluster without expensive precision in gear manufacture.

Other objects, advantages and novel features of this invention will become apparent from the following detailed description of the invention when considered in conjunction with the accompanying drawings wherein:

DESCRIPTION OF A PREFERRED EMBODIMENT

Figure 1:
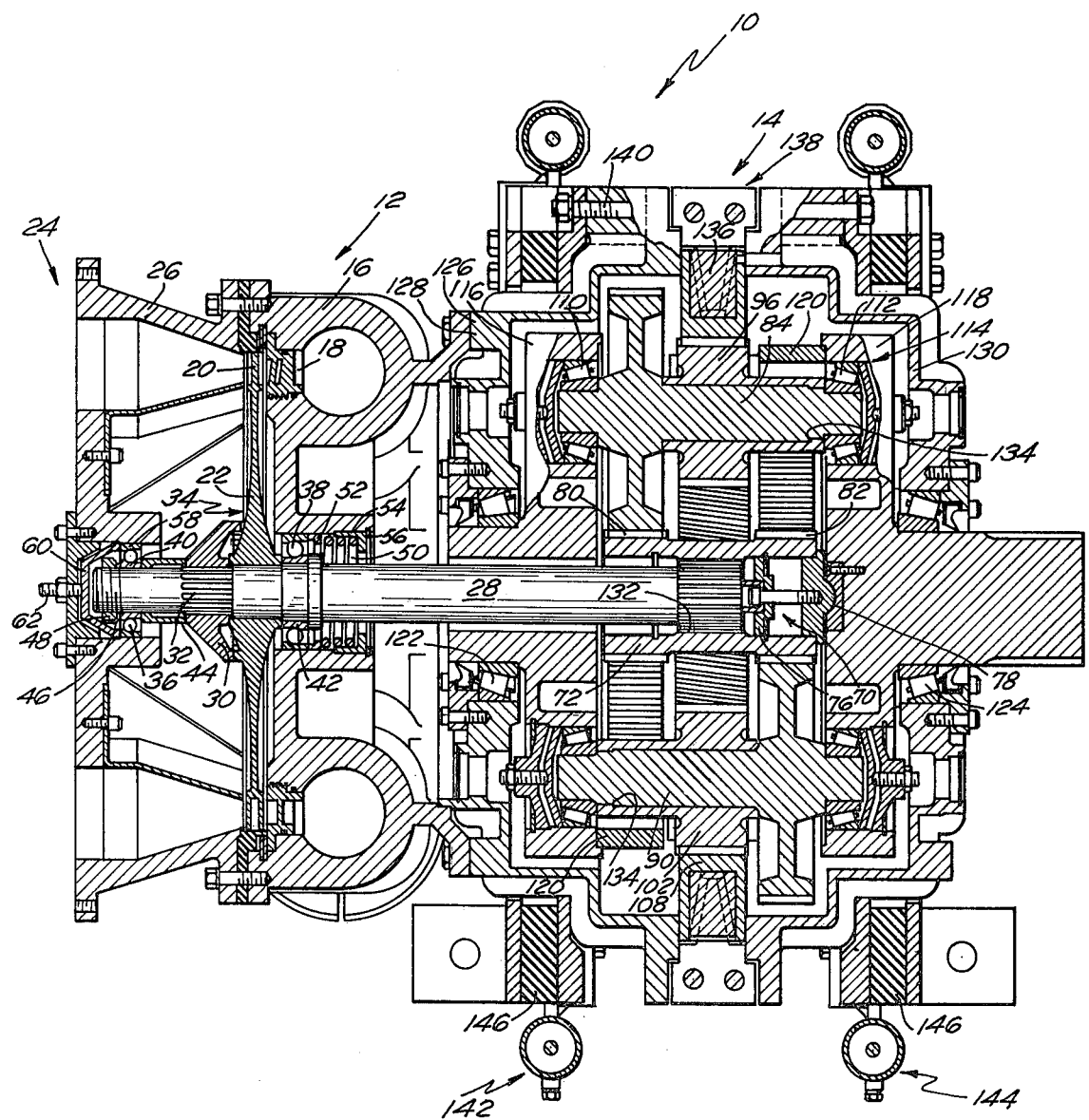
FIG. 1 is a multi-cross sectional view of a high pressure air turbine-gear train system which uses the technique of tooth gear alignment by accommodation according to the teachings of subject invention.
Figure 2:
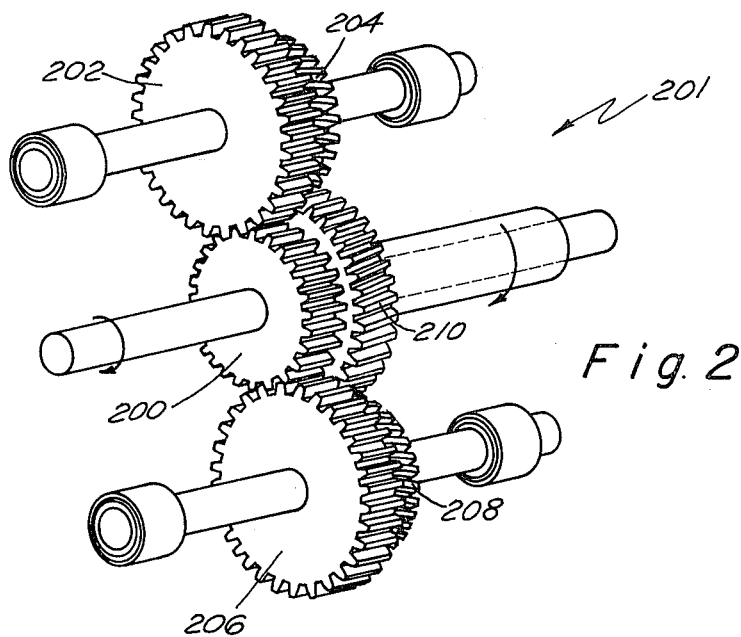
FIG. 2 is a schematic representation of a cluster of gear systems including two or more stages.
Figure 3:
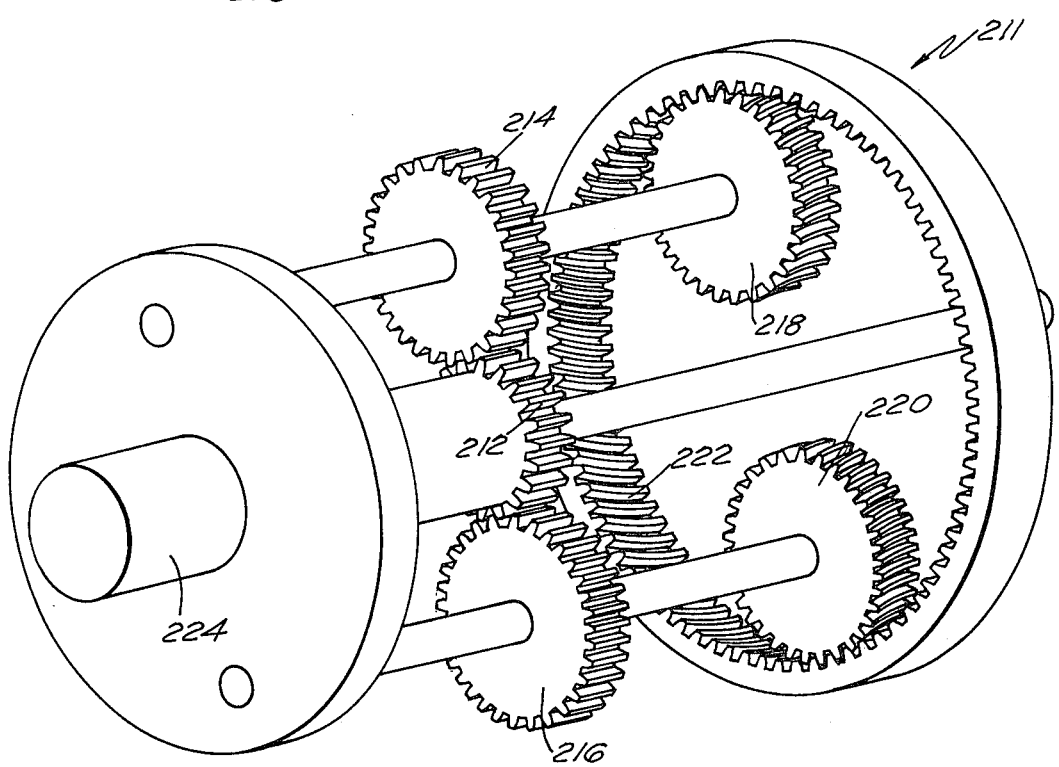
FIG. 3 is another representation of a gear system which includes more than two stages.

Referring to the drawings wherein like reference characters designate like parts throughout the several views and more particularly to FIG. 1 thereof, a multi-cross sectional view of a high pressure air turbine-gear train assembly using the gear tooth alignment technique of subject invention is shown. FIG. 2 schematically shows a star cluster 201 of gears wherein input gear or driving gear 200 drives a first stage gear 202 which drives a second stage pinion 204. Simultaneously, driving gear 200 also drives another first stage gear 206 which in turn drives the second stage pinion 208 in the star cluster. As shown in FIG. 2, the output gear is 210. Another gear cluster 211 is shown in FIG. 3 wherein the driving gear 212 is driving the first stage gears 214 and 216. Gear 214 drives second stage pinion 218 and gear 216 drives second stage pinion 220. Gears 218 and 220 interact with ring gear 222 which may be fixed or turning. If ring gear 222 is fixed, the output is given by the output planet carrier 224 and gear system is an epicyclic system. On the other hand, if the planet carrier 224 is stationary and the ring gear is turning, the arrangement is another form of a cluster gear assembly of FIG. 2.

As shown in FIG. 1, the cluster assembly including gears 84 and 96 have gears hardened and ground separately and fitted with an easy fit between the shaft of gear 84 and the bore of gear 96. A fixture is used to assemble these gears so that one tooth of gear 84 is located within preferably ± 0.005 inch of one of the teeth of gear 96. There is a slight interference for distance designated as 134 between the two gear elements. Gears 84 and 96 are electron beam welded together along distance 134 to form a cluster assembly. The resulting assembly length is dictated by the face width of the gears and the hub length of gear 96 of FIG. 1. The torque path length from gear 84 to gear 96 is the length of the solid shaft on gear 84 plus the length of the hollow shaft on gear 96. Both solid and hollow shafts are stressed close to yield strength during operation. This results in a torsionally soft shaft which must deflect to transmit torque and the difference in torque between clusters in a parallel, a branched or an epicyclic system using this arrangement will be limited to the torque necessary to deflect the shaft torsionally to the amount of error and tooth placement accuracy at the pitch line of the smaller gear 96.

The dynamic increment of load at any gear mesh is a product of the acceleration and the effective mass being accelerated. The acceleration is a function of the speed and the error in action of the gear tooth surfaces. The effective mass at any mesh is given by:

$$\frac{1}{m_e} = \frac{1}{m_1} + \frac{1}{m_2} = \frac{m_1 \cdot m_2}{m_1 + m_2}$$

where $m_e$ is the effective mass, $m_1$ is the mass of the pinion and its connected masses and $m_2$ is the mass of the gear and its connected masses. The arrangement as described above in this system essentially isolates the mass of the gear in the cluster from the other masses and the effective mass may be assumed to be equal to or less than that of the gear on either end of the shaft with respect to its mass. In this arrangement, the maximum dynamic increment of load between gears 84 and 96 is limited to the acceleration of gear 84 plus the force necessary to deflect the shaft the amount of the error at the pitch point. The maximum dynamic increment of load between gears 96 and 108 is limited to the acceleration of gear 96 plus the force necessary to deflect the shaft the amount of error at its pitch point. This arrangement thus isolates the mass of one gear in the cluster from that of the others and the effective mass is equal to or less than that of the gear on either end of the shaft with respect to its mass.

Gear tooth alignment by accommodation is realized by the same torsionally soft shaft by limiting the unbalanced load between the gears of the system to the load necessary to deflect the shaft the amount of the tooth placement error.

Briefly stated, method and apparatus for gear tooth alignment by accommodation includes a system which isolates the mass of one gear and the cluster from that of the other and makes the effective mass to be equal to or less than that of the gear on the either end of the shaft with respect to its mass. This arrangement permits a design for extremely high power to weight ratios for speed reducers by isolating inertias of the elements and thereby reducing dynamic loads and thus having a torsionally soft shaft which permits alignment of gears by accommodation.

Obviously, many modifications and variations of the present invention may become apparent in the light of above teachings. As an example, the amount of distance along which the two gears are electron beam welded can be varied without deviating from the teachings of subject invention. Furthermore, the resulting assembly length can also vary depending upon the face widths and the hub lengths of the gears. It is therefore understood that within the scope of the appended claims the invention may be practiced otherwise than specifically described.

I claim:

1. A method of gear tooth alignment in a two stage cluster assembly having a first gear as a first piece, hardened and ground separately, having a shaft and a second stage pinion as a second piece, hardened and ground separately, and having a bore in a multi-cluster gear train system comprising the steps of:

fitting loosely the shaft of the first piece and the bore of the second piece;

welding an area of contact of the first piece and the second piece to form a compact cluster;

assembling the compact cluster in said multi-cluster gear train system; and isolating mass of first piece from the masses of the remaining component of the gear train system.

2. The method of claim 1 which further includes the step of making a torsionally soft shaft in said compact cluster.

3. The method of claim 1 which further includes the step of alignment of gear teeth by accommodation due to unbalanced load applied to the torsionally soft shaft.

* * * * *